(12) United States Patent
Yoshimura et al.

(10) Patent No.: US 9,158,487 B2
(45) Date of Patent: *Oct. 13, 2015

(54) IMAGE FORMING SYSTEM WITH AUTHENTICATION UNIT, IMAGE FORMING APPARATUS, AND COMPUTER READABLE MEDIUM

(71) Applicant: FUJI XEROX CO., LTD., Tokyo (JP)

(72) Inventors: Tomokazu Yoshimura, Kanagawa (JP); Hisashi Shirakawa, Kanagawa (JP); Makoto Hamada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/471,609

(22) Filed: Aug. 28, 2014

(65) Prior Publication Data

US 2014/0368864 A1    Dec. 18, 2014

Related U.S. Application Data

(63) Continuation of application No. 13/299,950, filed on Nov. 18, 2011, now Pat. No. 8,854,664.

(30) Foreign Application Priority Data

Jun. 14, 2011  (JP) .................................. 2011-132472

(51) Int. Cl.
  *G06K 15/00* (2006.01)
  *G06F 3/12* (2006.01)
  (Continued)

(52) U.S. Cl.
  CPC ............ *G06F 3/1238* (2013.01); *G06F 3/1203* (2013.01); *G06F 3/1204* (2013.01);
  (Continued)

(58) Field of Classification Search
  CPC ... G06F 3/1204; G06F 3/1238; G06F 3/1267; G06F 3/1291; G06F 3/1203; G06F 3/1285; H04N 1/0023; H04N 1/00347; H04N 1/00474; H04N 1/4426; H04N 1/4433; H04N 1/00427

USPC ............... 358/1.1, 1.9, 1.13, 1.14, 1.15, 1.18, 358/402, 403; 709/201, 213, 217
See application file for complete search history.

(56) References Cited

U.S. PATENT DOCUMENTS 7,706,710 B2   4/2010  Funahashi
8,330,980 B2  12/2012  Sorrentino et al.
(Continued)

FOREIGN PATENT DOCUMENTS

JP  2007-193407 A   8/2007
JP  2007-228442 A   9/2007
(Continued)

OTHER PUBLICATIONS

Office Action dated Jan. 24, 2013 issued in Australian Patent Application No. 2011256893.

*Primary Examiner* — Gabriel Garcia
(74) *Attorney, Agent, or Firm* — Oliff PLC (57) ABSTRACT

An image forming system includes a transmitter apparatus that transmits, to a predetermined storage location of multiple storage locations, identification information identifying a user and image data associated with the identification information, and multiple image forming apparatuses. Each of the image forming apparatuses includes a first storage unit that stores storage information indicating the storage locations, a storage location that is included in the storage locations and stores the identification information and the image data associated with the identification information, a retrieval unit that accesses the storage locations, indicated by the storage information stored on the first storage unit, when the identification information is inputted by the user, and retrieves the image data from the storage location, and an image forming unit that forms an image corresponding to the image data retrieved by the retrieval unit.

6 Claims, 9 Drawing Sheets

(51) Int. Cl.
*H04N 1/00* (2006.01)
*H04N 1/44* (2006.01)

(52) U.S. Cl.
CPC ............ *G06F3/1267* (2013.01); *G06F 3/1285* (2013.01); *G06F 3/1291* (2013.01); *H04N 1/0023* (2013.01); *H04N 1/00347* (2013.01); *H04N 1/00427* (2013.01); *H04N 1/00474* (2013.01); *H04N 1/4426* (2013.01); *H04N 1/4433* (2013.01); *H04N 2201/0039* (2013.01); *H04N 2201/0094* (2013.01)

(56) References Cited

U.S. PATENT DOCUMENTS

| | | |
|---|---|---|
| 8,339,639 B2 | 12/2012 | St. Jacques, Jr. et al. |
| 2004/0034654 A1 | 2/2004 | Simpson et al. |
| 2006/0216093 A1 | 9/2006 | Ueda et al. |
| 2006/0285150 A1 | 12/2006 | Jung et al. |
| 2007/0201083 A1 | 8/2007 | Fukui et al. |
| 2007/0230985 A1 | 10/2007 | Funahashi |
| 2008/0244756 A1 | 10/2008 | Kitada |
| 2010/0141983 A1 | 6/2010 | Sorrentino et al. |
| 2010/0149572 A1 | 6/2010 | St. Jacques, Jr. et al. |
| 2012/0127504 A1* | 5/2012 | Nuggehalli et al. ......... 358/1.13 |

FOREIGN PATENT DOCUMENTS

| | | |
|---|---|---|
| JP | A-2008-242851 | 10/2008 |
| JP | 2009-009600 A | 1/2009 |

* cited by examiner

| USER ID | PASSWORD |
|---------|----------|
| user001 | 1234 |
| user002 | 5678 |
| ... | ... |

| SPOOLER INFORMATION |
|---------------------|
| spoolerA |
| spoolerB |
| spoolerC |
| spoolerD |

| RETRIEVAL TIME | USER ID | SPOOLER INFORMATION |
|---|---|---|
| 2011:05:10:10:00 | user001 | spoolerC |
| 2011:05:10:10:10 | user002 | spoolerA |
| 2011:05:10:10:15 | user001 | spoolerC |
| ... | ... | ... |

FIG. 11

| SPOOLER INFORMATION | RETRIEVAL RATIO |
|---|---|
| spoolerA | 2 % |
| spoolerB | 0 % |
| spoolerC | 90 % |
| spoolerD | 8 % |

FIG. 12

IMAGE FORMING SYSTEM WITH AUTHENTICATION UNIT, IMAGE FORMING APPARATUS, AND COMPUTER READABLE MEDIUM

CROSS-REFERENCE TO RELATED APPLICATIONS

This is a Continuation application of application Ser. No. 13/299,950 filed Nov. 18, 2011 which is based on and claims priority under 35 USC 119 from Japanese Patent Application No. 2011-132472 filed Jun. 14, 2011.

BACKGROUND (i) Technical Field

The present invention relates to an image forming system, an image forming apparatus, and a computer readable medium storing a program causing a computer to execute a process for forming an image.

(ii) Related Art

According to one related art technique, a print server apparatus stores image data specified by a user, and then allows multiple image forming apparatuses to access the image data.

SUMMARY

According to an aspect of the invention, there is provided an image forming system. The image forming system includes a transmitter apparatus that transmits, to a predetermined storage location of multiple storage locations, identification information identifying a user and image data associated with the identification information, and multiple image forming apparatuses. Each of the image forming apparatuses includes a first storage unit that stores storage information indicating the storage locations, a storage location that is included in the storage locations and stores the identification information and the image data associated with the identification information, the identification information and the image data being transmitted from the transmitter apparatus, a retrieval unit that accesses the storage locations, indicated by the storage information stored in the first storage unit, when the identification information is inputted by the user, and retrieves the image data from the storage location, and an image forming unit that forms an image corresponding to the image data retrieved by the retrieval unit.

BRIEF DESCRIPTION OF THE DRAWINGS

Exemplary embodiments of the present invention will be described in detail based on the following figures, wherein.

DETAILED DESCRIPTION

Figure 1:
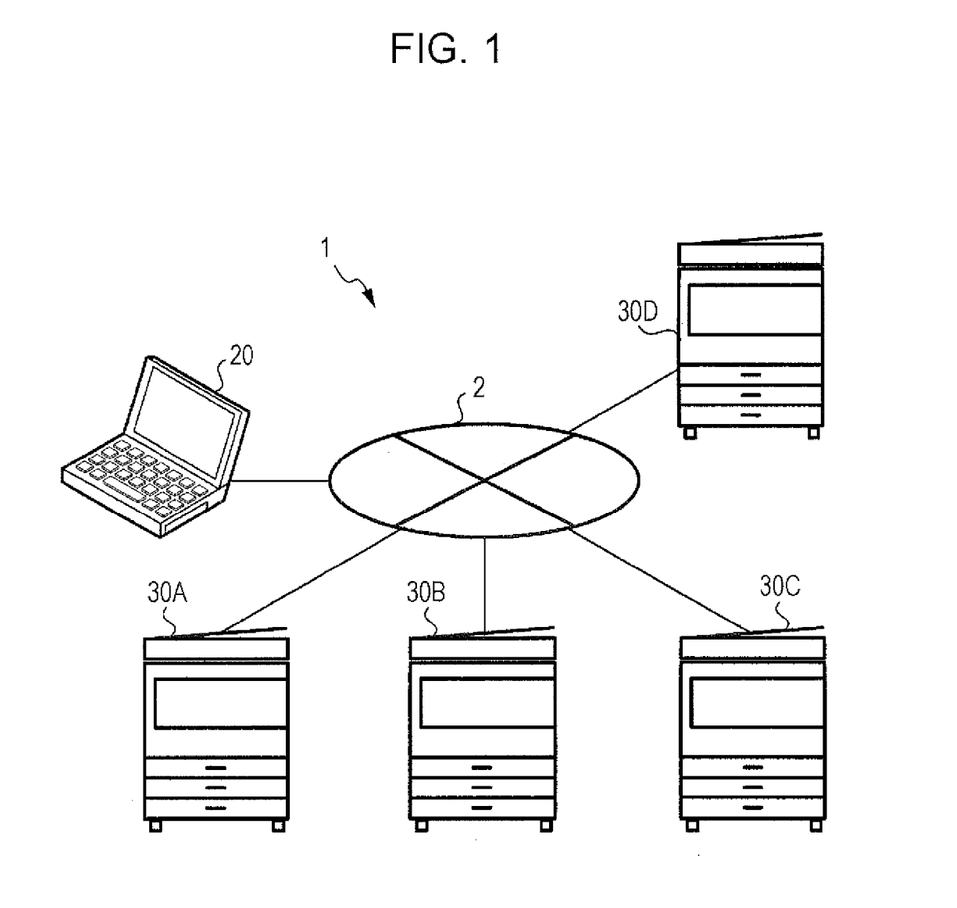
FIG. 1 diagrammatically illustrates a configuration of an image forming system.

FIG. 1 diagrammatically illustrates an image forming system 1 of an exemplary embodiment of the present invention. The image forming system 1 includes client apparatus 20 (an example of a transmitter apparatus), and image forming apparatuses 30A, 30B, 30C, and 30D. Each of the image forming apparatuses 30A, 30B, 30C, and 30D is referred to as an image forming apparatus 30 without the suffix A, B, C, or D if it is not necessary to discriminate one from another among the image forming apparatuses 30A, 30B, 30C, and 30D. The client apparatus 20 transmits the print data to the image forming apparatus 30. The image forming apparatus 30 is an electrophotographic printer, for example. The image forming apparatus 30 includes a storage location storing the print data received from the client apparatus 20.

Figure 2:
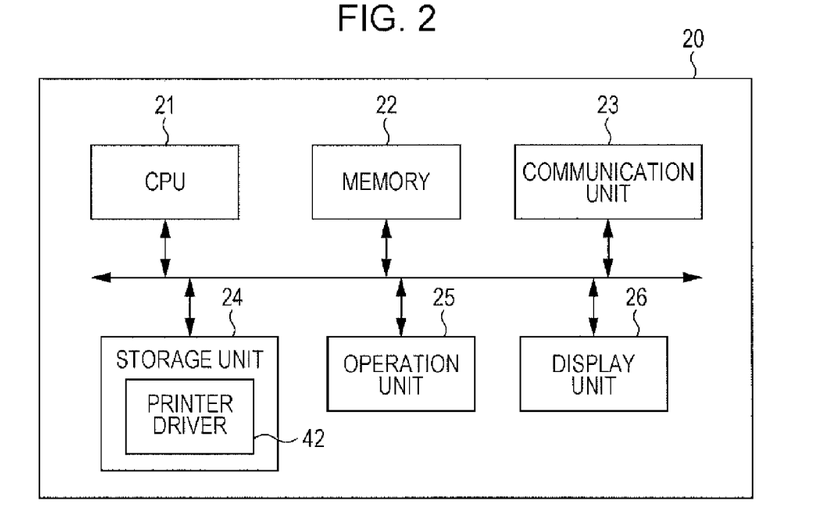
FIG. 2 illustrates a hardware configuration of a client apparatus.

FIG. 2 illustrates a hardware configuration of the client apparatus 20. The client apparatus 20 includes CPU 21, memory 22, communication unit 23, storage unit 24, operation unit 25, and display unit 26. The CPU 21 executes a program stored on the memory 22, thereby controlling each of the elements of the client apparatus 20. The communication unit 23 is a communication interface connected to a communication line 2. The CPU 21 communicates with the image forming apparatus 30 via the communication unit 23. The storage unit 24 may be a hard disk. The storage unit 24 stores a printer driver 42. The printer driver 42 is a program controlling the image forming apparatus 30. The operation unit 25 includes a keyboard and a mouse, for example. The operation unit 25 is used to operate the client apparatus 20. The display unit 26 displays an image corresponding to image data.

A user ID and spooler information are beforehand set in the printer driver 42. The user ID is identification information identifying the user. The spooler information indicates a storage location where the print data received from the client apparatus 20 is stored. The spooler information indicates a storage location of one of the image forming apparatuses 30A, 30B, 30C, and 30D. For example, the spooler information may be an Internet protocol (IP) address assigned to the image forming apparatus 30 or a name of the image forming apparatus 30. User ID "user001" and spooler information "spoolerC" indicative of the storage location of the image forming apparatus 30C are set in the printer driver 42. The spooler information set in the printer driver 42 may be modified by the user.

Figure 3:
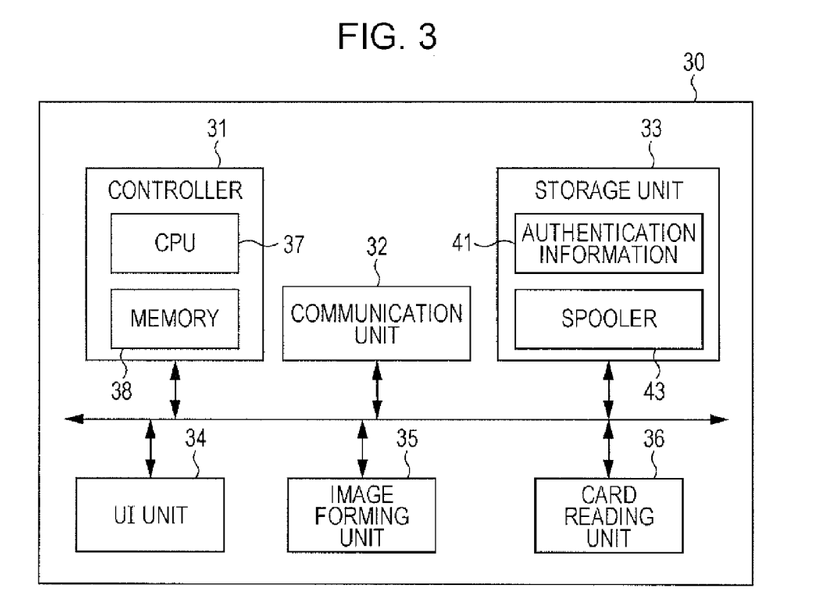
FIG. 3 illustrates a hardware configuration of an image forming apparatus.

FIG. 3 illustrates a hardware configuration of the image forming apparatus 30. The image forming apparatus 30 includes controller 31, communication unit 32, storage unit 33, user interface (UI) unit 34, image forming unit 35, and card reading unit 36. The controller 31 includes CPU 37, and memory 38. The CPU 37 executes a program stored on the memory 38, thereby controlling each of the elements of the image forming apparatus 30. The communication unit 32 is a communication interface connected to the communication line 2. The controller 31 communicates with one of the client apparatus 20, and another image forming apparatus 30 via the communication unit 32. The storage unit 33 (an example of a first storage unit) may be a hard disk. The storage unit 33 stores the print data received from the client apparatus 20. The storage unit 33 also stores authentication information 41 and a spooler list 43 (an example of storage information).

Figure 4:
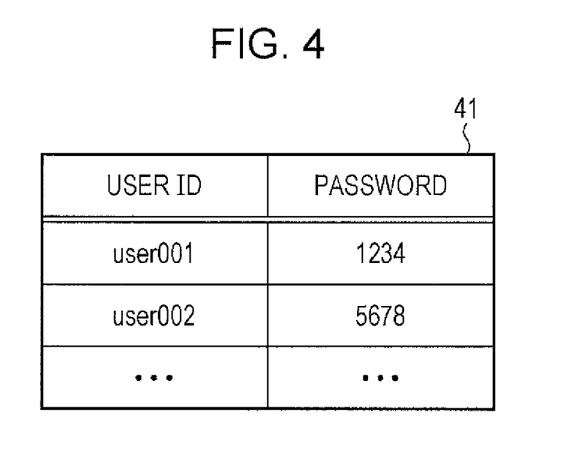
FIG. 4 illustrates an example of authentication information.

FIG. 4 illustrates an example of the authentication information 41. The authentication information 41 includes a user ID and a password. The user ID is identification information identifying the user. The password is used to verify that the user is an authorized user. The password is set up by the user.

Figure 5:
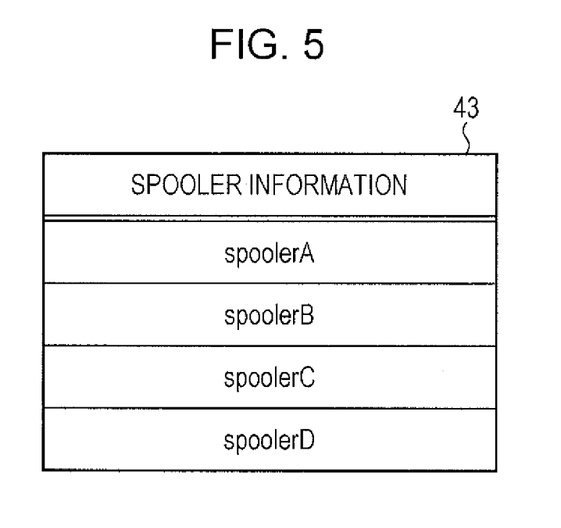
FIG. 5 illustrates an example of a spooler list.

FIG. 5 illustrates an example of the spooler list 43. The spooler list 43 lists the spooler information indicating the storage locations of the image forming apparatuses 30 included in the image forming system 1. As described above, the image forming system 1 includes the image forming apparatuses 30A, 30B, 30C, and 30D. The spooler list 43 of FIG. 5 thus lists spooler information "spoolerA" indicating a storage location of the image forming apparatus 30A, spooler information "spoolerB" indicating a storage location of the image forming apparatus 30B, spooler information "spoolerC" indicating a storage location of the image forming apparatus 30C, and spooler information "spoolerD" indicating a storage location of the image forming apparatus 30D.

The UI unit 34 of FIG. 3 includes a touchscreen and keys. The UI unit 34 is used to operate the image forming apparatus 30. The image forming unit 35 forms on paper an image corresponding to the image data. The card reading unit 36 reads information, stored on an integrated circuit (IC) card, in a contactless fashion. The IC card is beforehand supplied to the user to authenticate the user. The IC card stores the user ID "user001" and password "1234" of the user included in the authentication information 41.

Figure 6:
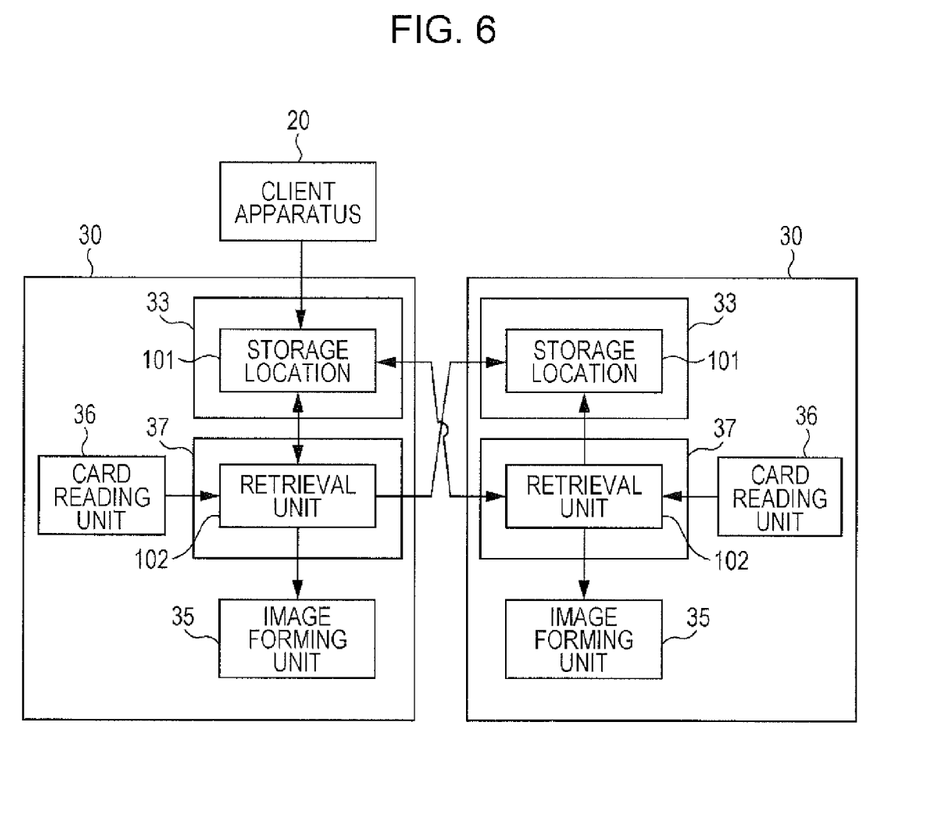
FIG. 6 is a functional block diagram of the image forming system.

FIG. 6 is a functional block diagram of the image forming system 1. In the image forming system 1, one image forming apparatus 30 is identical in function to another image forming apparatus 30. A storage location 101 is arranged in the storage unit 33. A retrieval unit 102 is implemented when the CPU 37 executes the program. The client apparatus 20 transmits the user ID identifying the user and the image data associated with the user ID to a predetermined storage location 101 out of multiple storage locations 101. The storage location 101 stores in an associated state the user ID and the image data received from the client apparatus 20. When the user enters the user ID using the card reading unit 36, the retrieval unit 102 accesses multiple storage locations indicated by the spooler list 43 stored on the storage unit 33, and retrieves the image data from the storage location storing the image data associated with the input user ID. The image forming unit 35 forms an image corresponding to the image data retrieved by the retrieval unit 102.

Figure 7:
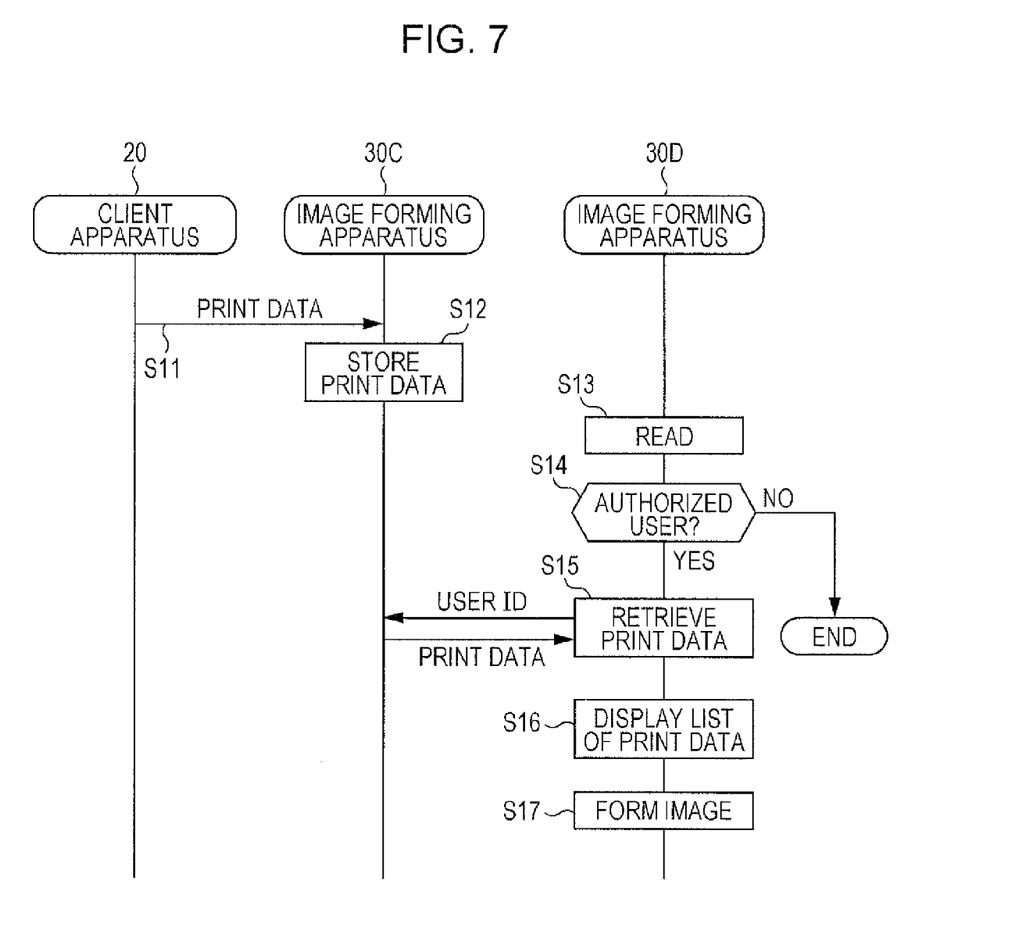
FIG. 7 is a sequence chart illustrating an operation of the image forming system.

FIG. 7 is a sequence chart of the operation of the image forming system 1. The user specifies the image data using the operation unit 25 in the client apparatus 20 and issues an image forming instruction of the image data. The CPU 21 executes the printer driver 42, thereby generating the print data including the image data specified by the user and the user ID of the user. The user may specify image data D1 here. As described above, the user ID "user001" of the user is set in the printer driver 42. The print data thus includes the user ID "user001" and the image data D1.

Upon generating the print data, the CPU 21 transmits the generated print data to the storage location set in the printer driver 42 via the communication unit 23 (step S11). As described above, the spooler information "spoolerC" is set in the printer driver 42. The print data is thus transmitted to the image forming apparatus 30C.

A controller 31C in the image forming apparatus 30C receives the print data from the client apparatus 20 via a communication unit 32C. Upon receiving the print data, the controller 31C causes a storage unit 33C to store the received print data (step S12). In this process, the print data including the image data D1 and the user ID "user001" is received from the client apparatus 20. The storage unit 33C stores the print data including the image data D1 and the user ID "user001." In the storage operation, the storage unit 33C associates the image data D1 with the user ID "user001."

After providing an image forming instruction on the client apparatus 20, the user moves to a place where one of the image forming apparatuses 30A, 30B, 30C, and 30D is installed. For example, the user may move to the place where the image forming apparatus 30 usually used by the user is installed. If the image forming apparatus 30 usually used by the user is currently used by someone else, the user may move to another image forming apparatus 30 nearby. The user may move to an image forming apparatus 30 closest to them. In other words, the user moves to a place to use one of the image forming apparatuses 30A, 30B, 30C, and 30D. The user may now move to the image forming apparatus 30D.

The UI unit 34 in the image forming apparatus 30 presents an authentication screen. The image forming apparatus 30 receives no input from the user if the user is not authenticated. The user moves to the image forming apparatus 30D and swipes their IC card over the card reading unit 36D for authentication. If the IC card is positioned close to the card reading unit 36D, the card reading unit 36D reads the user ID and the password stored on the IC card (step S13). Upon reading these pieces of information from the IC card, the card reading unit 36D inputs the read information to the controller 31D. As described above, the IC card stores the user ID "user001" and the password "1234." The user ID "user001" and the password "1234" are input to the controller 31B.

If the user ID and the password are input, the controller 31D checks the input user ID and password against the user ID and password included in the authentication information 41 stored on the storage unit 33D. The controller 31D thus determines whether a user of the image forming apparatus 30D is an authorized user (step S14). If the input user ID and password are not included in the authentication information 41, the controller 31D determines that the user of the image forming apparatus 30D is not an authorized user (no loop from step S14). The controller 31D causes the UI unit 34D to display a message to the effect that authentication is unsuccessful, and ends the process. As illustrated in FIG. 4, the input user ID "user001" and password "1234" are included in the authentication information 41. In such a case, the controller 31D determines that the user of the image forming apparatus 30D is an authorized user (yes loop from step S14).

If the user of the image forming apparatus 30D is an authorized user, the controller 31D accesses all the storage locations indicated by the spooler information of the spooler list 43 stored on the storage unit 33D, and retrieves the print data including the user ID of the user (step S15). The spooler list 43 of FIG. 5 lists spooler information "spoolerA," "spoolerB," "spoolerC," and "spoolerD." The controller 31D thus accesses the image forming apparatuses 30A, 30B, and 30C and the storage unit 33D of the host image forming apparatus 30D. More specifically, the controller 31D accesses the storage unit 33D and determines whether the print data including the user ID "user001" is stored on the storage unit 33D. If the print data is stored on the storage unit 33D, the controller 31D reads all the print data from the storage unit 33D. The controller 31D notifies the image forming apparatuses 30A, 30B, and 30C of the user ID "user001" via the communication unit 32D, and requests the image forming apparatuses 30A, 30B, and 30C to transmit the print data including that user ID. In response, the image forming apparatuses 30A, 30B, and 30C transmit the print data including the user ID to the image forming apparatus 30D. More specifically, a controller 31A in the image forming apparatus 30A determines whether the print data including the user ID is stored on a storage unit 33A. If the user ID is stored on the storage unit 33A, the controller 31A reads all the print data from the storage unit 33A. The controller 31A transmits the read print data to the image forming apparatus 30D via a communication unit 32A. The image forming apparatuses 30B and 30C operate in a similar fashion. In the above-described step S12, the print data including the user ID "user001" and the image data D1 is stored on a storage unit 33C. The print data is thus transmitted from the image forming apparatus 30C. The controller 31D in the image forming apparatus 30D receives the print data via the communication unit 32D if the print data is transmitted from the image forming apparatus 30C.

Figure 8:
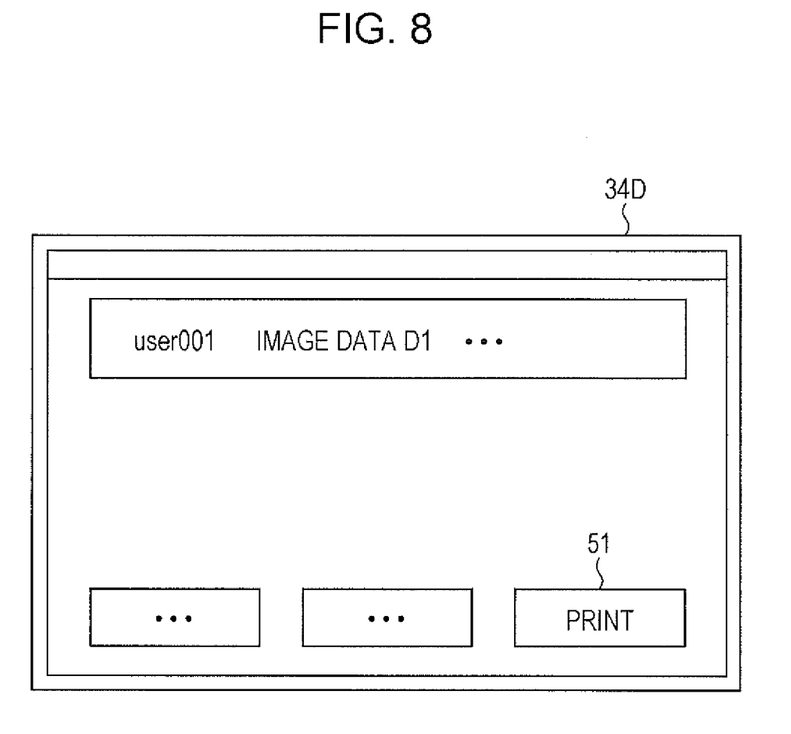
FIG. 8 illustrates a list of print data of the exemplary embodiment.

Upon receiving the print data, the controller 31D causes the UI unit 34D to display a list of the retrieved print data (step S16). FIG. 8 illustrates the list of the print data displayed on the UI unit 34D. Displayed in the list of the print data is identification information identifying the print data retrieved in step S15. The list of the print data of FIG. 8 includes the user ID "user001" and the file name of the image data D1 included in the print data retrieved from the image forming apparatus 30C. Using the UI unit 34D, the user selects print data from the list of the print data and presses a "PRINT" button 51. If the "PRINT" button 51 is pressed, the controller 31D extracts the image data from the selected print data, and causes the image forming unit 35D to form an image corresponding to the extracted image data (step S17). A region displaying the user ID "user001" and the file name of the image data D1 may be selected and the "PRINT" button 51 may be pressed in the list of the print data of FIG. 8. The controller 31D extracts the image data D1 from the print data received from the image forming apparatus 30C. The image forming unit 35D outputs an image corresponding to the extracted image data D1 by forming the image on a paper sheet.

In the exemplary embodiment, the image corresponding to the image data may be formed using any of the image forming apparatuses 30 if each of the image forming apparatuses 30 has the storage location storing the image data.

The present invention is not limited to the exemplary embodiment described above. The exemplary embodiment may be modified as described below and resulting modifications may be combined.

First Modification

Figure 9A:
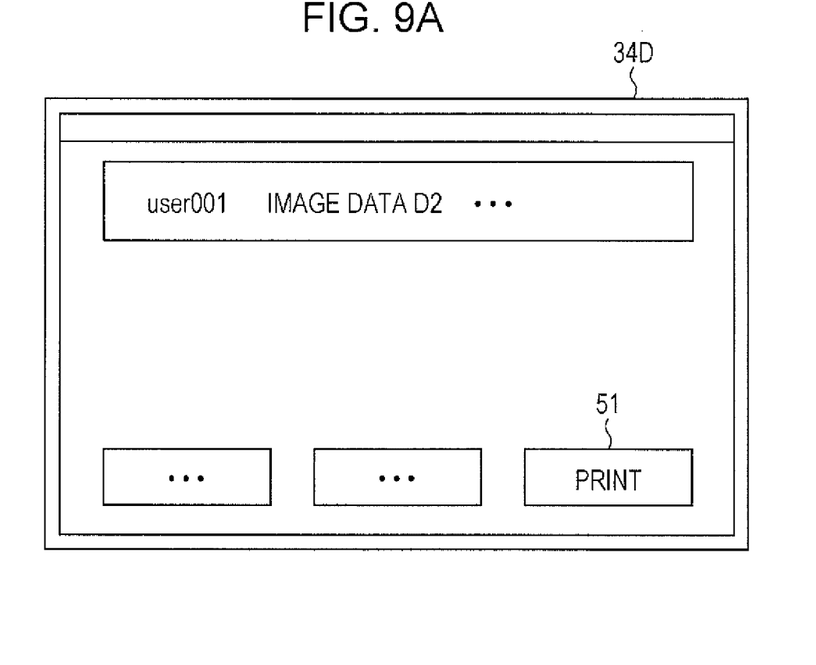
FIGS. 9A and 9B illustrate an example of the print data of a modification of the exemplary embodiment.

In the above-described step S15, the controller 31D may access first the storage unit 33D (an example of an internal storage location) in the host apparatus, and may then access the storage location (an example of an external storage location) of each of the other image forming apparatuses 30A, 30B, and 30C via the communication unit 32D. It is assumed herein that the storage unit 33C in the image forming apparatus 30C stores first print data including the user ID "user001" and the image data D1 and that the storage unit 33D stores second print data including the user ID "user001" and image data D2. The controller 31D accesses first the storage unit 33D to retrieve the second print data. Upon retrieving the second print data, the controller 31D (an example of a display controller) causes the UI unit 34D (an example of a display unit) to display a list of the print data corresponding to the second print data. FIG. 9A illustrates an example of the list of the print data displayed on the UI unit 34D. The list of the print data lists the user ID "user001" and the file name of the image data D2 included in the second print data. When the list of the print data is displayed, the user may select the second print data and press the "PRINT" button 51.

Figure 9B:
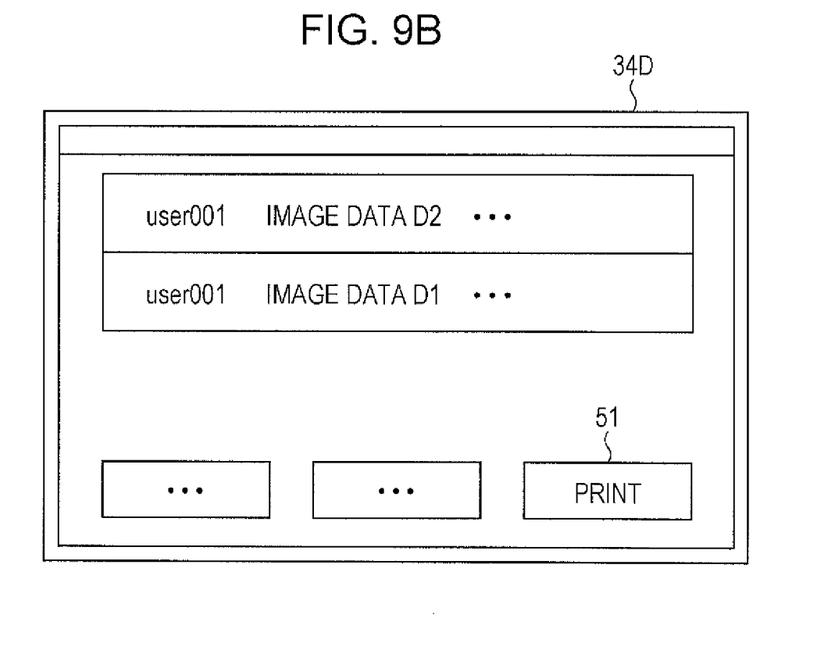

The controller 31D accesses the storage unit 33D and then accesses the image forming apparatuses 30A, 30B, and 30C via the communication unit 32D. The controller 31D thus retrieves the first print data from the image forming apparatus 30C. Upon retrieving the first print data, the controller 31D adds the identification information of the retrieved first print data to the list of the print data displayed on the UI unit 34D. FIG. 9B illustrates an example of the resulting list of the print data displayed on the UI unit 34D. The list of the print data lists, in addition to the identification information of the second print data illustrated on FIG. 9A, the user ID "user001" and the file name of the image data D1 included in the first print data. The list of the print data typically lists the identification information of the print data retrieved from the storage unit 33D on the top thereof. The identification information of the first print data is displayed below the identification information of the second print data on the list. In the list of the print data of the modification, the identification information of the print data retrieved from the storage unit 33D is displayed at a predetermined position. The position is not limited to the top of the list on the UI unit 34D. The position may be at the center position on the list. The position may be easily selectable by the user.

According to the modification, the print data stored on the host apparatus may be retrieved fast. When the list the print data of FIG. 9A is displayed, the selection of the print data retrieved from the storage location within the host apparatus is accepted, and the image forming is initiated. Since the identification information of the print data retrieved from the storage location within the host apparatus is typically displayed at the predetermined position, the user may select that print data with ease. Although the first print data and the second print data are retrieved from the different storage locations, the identification information of the first print data and the identification information of the second print data are displayed with one piece next to the other on the list as illustrated in FIG. 93. This arrangement may give an impression that the first print data and the second print data are stored on the same storage location.

Second Modification

As described above, the spooler information indicating the storage location of the print data is set beforehand in the printer driver 42 of the client apparatus 20. The print data transmitted from the same client apparatus 20 is stored on the same storage location each time if the spooler information is not modified. In step S15, the controller 31D may access the storage location in the order of from high to low retrieval frequency of the print data of the user.

Figure 10:
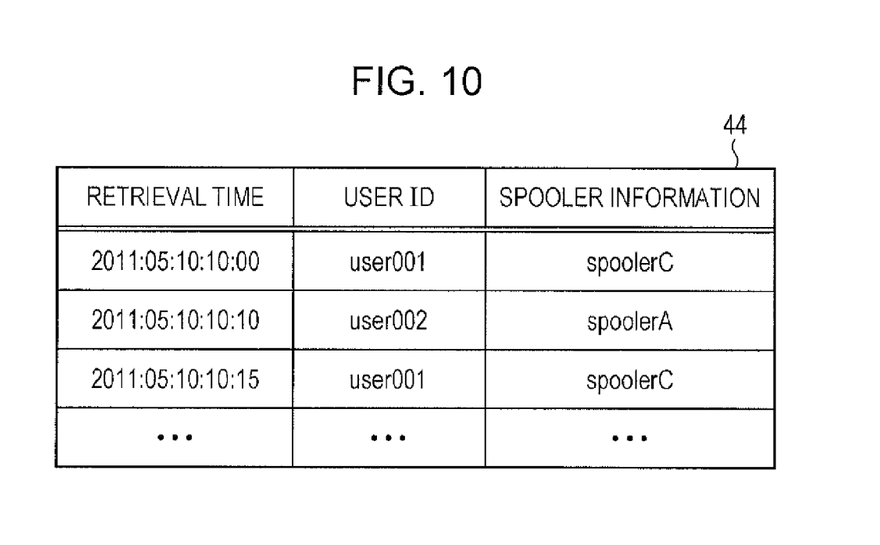
FIG. 10 illustrates an example of history information of the modification.

The storage unit 33D (an example of a second storage unit) stores history information 44. The history information 44 indicates on a per user basis a history of the storage location from which the print data is retrieved. FIG. 10 illustrates an example of the history information 44. The history information 44 related to past operations of the image forming apparatus 30D lists, in an associated state, retrieval time of the print data, a user ID inputted by the user, and the spooler information indicating the storage location from which the print data is retrieved. When the user ID is input in step S13, the controller 31D extracts history information 44 including the user ID from the history information 44 stored on the storage unit 33D. For example, if the user ID "user001" is input, the controller 31D extracts the history information 44 including the user ID "user001" from the history information 44 of FIG. 10.

Figure 11:
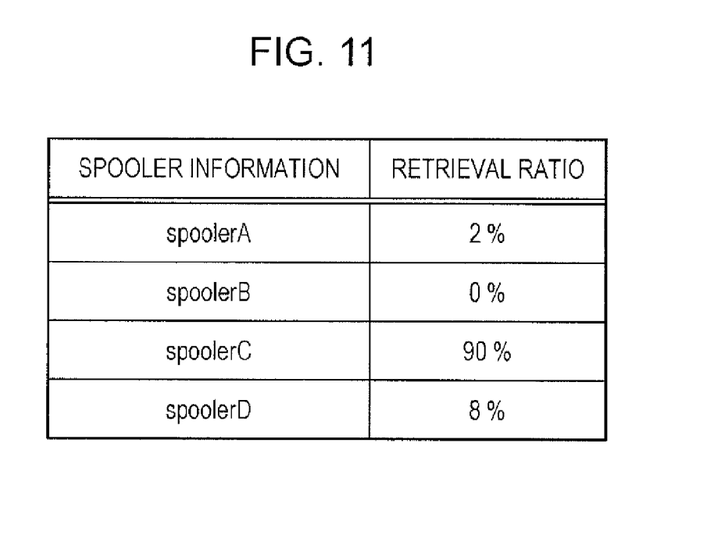
FIG. 11 illustrates an example of a retrieval ratio of the modification.

In response to the extracted history information 44, the controller 31D (an example of a calculator unit) calculates a retrieval ratio (an example of a retrieval frequency) at which the print data is retrieved from the storage location of the image forming apparatus 30. For example, the print data of the user having the user ID "user001" may be retrieved by 100 times, and out of 100 times, the number of times at which the print data may be retrieved from the storage location of the image forming apparatus 30C may be 90 times. In this case, the extracted history information 44 includes 100 pieces of spooler information and out of 100 pieces, 90 pieces of spooler information is "spoolerC." The retrieval ratio of the storage location of the image forming apparatus 30C is 90/100×100=90%. The retrieval ratio of another storage location is also calculated in a similar fashion. If the retrieval ratio of the storage location is calculated, the controller 31D causes the storage unit 33D to store, in an associated state, the calculated retrieval ratio of the storage location and the spooler information indicating the storage location. The retrieval ratio is thus stored on the storage unit 33D as illustrated in FIG. 11.

Upon calculating the retrieval ratio, the controller 31D accesses the storage locations in the order from high to low retrieval ratio in step S15. As illustrated in FIG. 11, the retrieval ratio of the storage location of the image forming apparatus 30A is "2%," the retrieval ratio of the storage location of the image forming apparatus 30B is "0%," the retrieval ratio of the storage location of the image forming apparatus 30C is "90%," and the retrieval ratio of the storage location of the image forming apparatus 30D is "8%." In this case, the controller 31D accesses the storage location of the image forming apparatus 30C having the highest retrieval ratio, then accesses the storage location the image forming apparatus 30D having the second highest retrieval ratio, then accesses the storage location of the image forming apparatus 30A having the third highest retrieval ratio, and finally accesses the storage location of the image forming apparatus 30B having the lowest retrieval ratio. The print data are retrieved fast from the storage locations in the order of from high low retrieval ratio.

Figure 12:
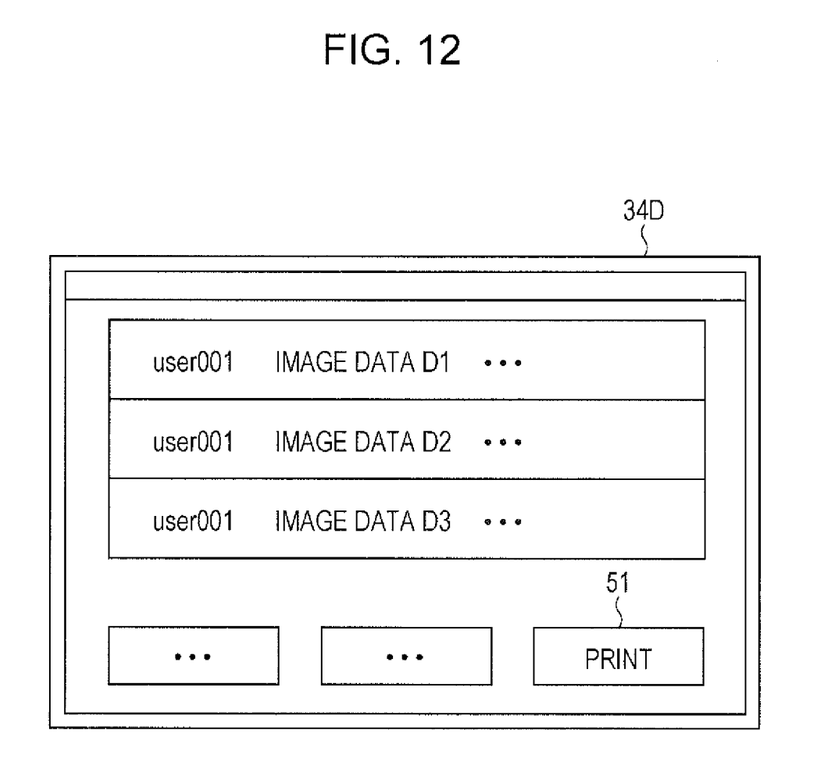
FIG. 12 illustrates a list of the print data of the modification.

If the print data are retrieved from multiple storage locations in step S15, the controller 31D (an example of a display controller) may arrange and display the identification information of the print data in the order of from high low calculated retrieval ratio in step S16. It is herein assumed in step S15 that first print data including the user ID "user001" and the image data D1 are retrieved from the storage location of the image forming apparatus 30C, that second print data including the user ID "user001" and image data D2 are then retrieved from the storage location of the image forming apparatus 30D, and that third print data including the user ID "user001" and the image data D3 are retrieved from the storage location of the image forming apparatus 30A. In the example of FIG. 11, the retrieval ratio of the storage location of the image forming apparatus 30A is "2%," the retrieval ratio of the storage location of the image forming apparatus 30C is "90%," and the retrieval ratio of the storage location of the image forming apparatus 30D is "8%." As illustrated in FIG. 12, the controller 31D causes the UI unit 34 to display, on the top of the list the print data, the identification information (the user ID "user001" and the file name of the image data D1) of the first print data retrieved from the storage location of the image forming apparatus 30C having the highest retrieval ratio. The UI unit 34 then displays on the second position of the list the identification information (the user ID "user001" and the file name of the image data D1) of the second print data retrieved from the storage location of the image forming apparatus 30D having the second highest retrieval ratio. The UI unit 34 then displays on the third position of the list the identification information (the user ID "user001" and the file name of the image data D3) of the third print data retrieved from the storage location of the image forming apparatus 30A having the third highest retrieval ratio. With ease, the user may select the print data retrieved from the storage location having the high retrieval ratio.

Third Modification

A new image forming apparatus 30E may be connected to the communication line 2. The image forming apparatuses 30A, 30E, 30C, and 30D may then detect that the new image forming apparatus 30E has been connected, and may add to the spooler list 43 the storage information indicating the storage location of the image forming apparatus 30E. More specifically, the controller 31A detects via the communication unit 32A that the new image forming apparatus 30E is connected. Upon detecting the connection of the new image forming apparatus 30E, the controller 31A requests the new image forming apparatus 30E via the communication unit 32A to transmit the spooler information. The image forming apparatuses 30B, 30C, and 30D perform a similar operation. In response to the request, a controller 31E in the image forming apparatus 30E transmits to the image forming apparatuses 30A, 30B, 30C, and 30D the spooler information indicating the storage location of the image forming apparatus 30E via a communication unit 32E. The spooler information is thus transmitted from the image forming apparatus 30E. The controller 31A receives the spooler information via the communication unit 32A. The controller 31A thus adds the received spooler information to the spooler list 43 stored on the storage unit 33A. More specifically, the controller 31A (an example of a storage controller) causes the storage unit 33A to store the spooler information retrieved from the image forming apparatus 30E. The image forming apparatuses 30B, 30C, and 30D perform a similar operation. The print data of the user is thus retrieved from the storage location of the image forming apparatus 30E.

The controller 31E also requests the image forming apparatuses 30A, 30B, 30C, and 30D via the communication unit 32E to transmit the spooler information. In response to the request, the controller 31A transmits to the image forming apparatus 30E the spooler information indicating the storage location of the image forming apparatus 30A via the communication unit 32A. The image forming apparatuses 30B, 30C, and 30D perform a similar operation. The controller 31E receives via the communication unit 32E the spooler information from the image forming apparatuses 30A, 30B, 30C, and 30D. The controller 31E generates the spooler list 43 using the received spooler information, and causes the storage unit 33E to store the spooler list 43. Alternatively, the controller 31E may request one of the image forming apparatuses 30A, 30B, 30C, and 30D to transmit the spooler list 43 via the communication unit 32E, receive the spooler list 43 transmitted in response to the request, and cause the storage unit 33E to store the spooler list 43. The image forming apparatus 30E may retrieve the print data of the user from the storage locations of the image forming apparatuses 30A, 30B, 30C, and 30D newly connected thereto via the communication line 2.

Fourth Modification

The image forming apparatus 30 may be disconnected from the communication line 2 for repair or dismounting. Another image forming apparatus 30 may detect the image forming apparatus 30 disconnected from the communication line 2 and may delete from the spooler list 43 the spooler information of the detected image forming apparatus 30. More specifically, the controller 31 periodically transmits to another image forming apparatus 30 via the communication unit 32 information verifying that the other image forming apparatus 30 is accessible. If the other image forming apparatus 30 replies, the controller 31 determines that the other image forming apparatus 30 remains connected to the communication line 2. For example, if no reply is received from the other image forming apparatus 30A, the image forming apparatus 30A may be disconnected from the communication line 2 or may be powered off. The image forming apparatuses 30B, 30C, and 30D determine whether the image forming apparatus 30A is disconnected from the communication line 2. More specifically, at predetermined time intervals, the controller 31B transmits to the image forming apparatus 30A via the communication unit 32B information verifying that the image forming apparatus 30A is accessible. This operation is consecutively repeated by a predetermined number of times. If no reply is received at each time, the controller 31B determines that the image forming apparatus 30A is disconnected from the communication line 2. The controller 31B (an example of a detector unit) thus detects the image forming apparatus 30A that is disconnected from the communication line 2. The image forming apparatuses 30C and 30D perform a similar operation. If the image forming apparatus 30A is detected as being disconnected from the communication line 2, the controller 31B deletes from the spooler list 43 the spooler information "spoolerA" indicating the storage location of the detected image forming apparatus 30A. Once the spooler information "spoolerA" is deleted from the spooler list 43, the image forming apparatus 30B does not access the image forming apparatus 30A. The image forming apparatuses 30C and 30D perform a similar operation.

If the image forming apparatus 30A is disconnected from the communication line 2 for repair, the image forming apparatus 30A may be reconnected to the communication line 2 after being repaired. In such a case, the process discussed with reference to the third modification is performed, storing the spooler list 43 of FIG. 5 on the storage unit 33A in the image forming apparatus 30A. The spooler information "spoolerA" indicating the storage location of the image forming apparatus 30A is added to the spooler list 43 of the image forming apparatuses 30B, 30C, and 30D. With this operation, the print data may be exchanged between the image forming apparatus 30A and each of the image forming apparatuses 30B, 30C, and 30D.

Fifth Modification

In the exemplary embodiment, the spooler information indicating a single storage location is set in the printer driver 42. The spooler information indicating multiple storage locations may be set. For example, primary spooler information and secondary spooler information may be set in the printer driver 42. The primary spooler information indicates a storage location having the highest priority. The secondary spooler information indicates a storage location having the second highest priority. Primary spooler information "spoolerC" and secondary spooler information "spoolerD" may now be set in the printer driver 42. Prior to transmitting the print data, the CPU 21 transmits a test message to the image forming apparatus 30C indicated by the primary spooler information "spoolerC" via the communication unit 23. If a reply is received in response to the message from the image forming apparatus 30C, the CPU 21 determines that normal communication is established with the image forming apparatus 30C. The CPU 21 then transmits the print data to the image forming apparatus 30C via the communication unit 23. If no reply is received from the image forming apparatus 30C within a predetermined period of time, the CPU 21 determines that normal communication with the image forming apparatus 30C is difficult. No reply may be received from the image forming apparatus 30C if a fault occurs in the image forming apparatus 30C or if a fault occurs in the communication line 2 between the client apparatus 20 and the image forming apparatus 30C. In such a case, the CPU 21 transmits via the communication unit 23 a test message to the image forming apparatus 30D indicated by the secondary spooler information "spoolerD." If a reply is received in response to the message from the image forming apparatus 30D within a predetermined period of time, the CPU 21 transmits the print data to the image forming apparatus 30D.

Sixth Modification

In the exemplary embodiment, the print data is stored on only one of the multiple storage locations. The same print data may be stored on the multiple storage locations. For example, the client apparatus 20 may transmit the print data to the multiple storage locations. As described with reference to the fifth modification, the primary spooler information "spoolerC" and the secondary spooler information "spoolerD" may now be set in the printer driver 42. When transmitting the print data to the image forming apparatus 30C, the client apparatus 20 also transmits the print data to the image forming apparatus 30D. The print data of the user may be difficult to retrieve from the image forming apparatus 30C if the image forming apparatus 30C remains powered off. With the print data transmitted to the image forming apparatus 30D, however, the print data may still be retrieved from the image forming apparatus 30D.

The image forming apparatus 30 having received the print data from the client apparatus 20 may make a copy of the print data and may transmit the copy to another storage location. In such a case, the storage location as a destination of the copy is predetermined. The image forming apparatus 30D may be set as the storage location of the copy destination in the image forming apparatus 30C. Upon receiving the print data from the client apparatus 20, the image forming apparatus 30C makes a copy of the print data and transmits the copy to the image forming apparatus 30D. The print data of the user may be difficult to retrieve from the image forming apparatus 30C if the image forming apparatus 30C remains powered off. With the copy of the print data transmitted to the image forming apparatus 30D, however, the print data may still be retrieved from the image forming apparatus 30D.

If the print data is retrieved from the image forming apparatus 30D, the image forming apparatus 30C may transmit to the image forming apparatus 30D information instructing the image forming apparatus 30D to delete the print data thereon. Upon receiving the information, the controller 31D in the image forming apparatus 30D deletes the specified print data from the storage unit 33D.

Seventh Modification

In the exemplar embodiment, the image forming apparatus 30 authenticates the user. The image forming system 1 may include an authentication server apparatus, and the authentication server apparatus may authenticate the user. The authentication information 41 is stored on a storage unit of the authentication server apparatus. When the user enters the user ID and password, the controller 31 in the image forming apparatus 30 transmits the input user ID and password to the authentication server apparatus via the communication unit 32 and then requests the authentication server apparatus to authenticate the user. In response to the request, the authentication server apparatus checks the user ID and password from the image forming apparatus 30 against the user ID and password included in the authentication information 41 stored on the storage unit. The authentication server apparatus thus determines whether the user of the image forming apparatus 30 is an authorized user. If the user of the image forming apparatus 30 is an authorized user, the authentication server apparatus transmits to the image forming apparatus 30 information indicating that authentication is successful. The controller 31 proceeds to step S15. The controller 31 does not need to perform step S14.

Eighth Modification

The number of client apparatuses 20 is not limited to one and the number of image forming apparatuses 30 is not limited to one. Depending on the number of users, the number of client apparatuses 20 and the number of image forming apparatuses 30 may be increased, or decreased Ninth Modification The authentication of the user may be performed without using the IC card. For example, the user may enter the user's own ID and password using the UI unit 34 in the image forming apparatus 30. Biometric information such as fingerprint may be used in place of the user ID and password. In such a case, the image forming apparatus 30 includes a device reading the biometric information.

Tenth Modification

The image forming apparatus 30 may be a printer that forms an image in a method other than the electrophotographic method. The image forming apparatus 30 may form a monochrome image or a color image. The image forming apparatus 30 may have a copying function and/or a scanning function Eleventh Modification The program executed by each CPU 21, and CPU 37 may be supplied in a recorded state on a recording medium such as magnetic tape, magnetic disk, flexible disk, optical disk, magneto-optical disk, or memory. The program may be then installed onto one of the client apparatus 20, and the image forming apparatus 30. The program may be downloaded onto one of the client apparatus 20, and the image forming apparatus 30 via a communication line such as the Internet.

Twelfth Modification

In the exemplary embodiment, the list of print data is displayed after the print data is retrieved in step S15. The image forming apparatus 30 may retrieve only the identification information of the print data prior to the retrieval of the print data, and then may display the list of print data. When the user selects the print data from the list of print data, the image forming apparatus 30 retrieves the selected print data from the storage location.

If the print data is retrieved in step S15, the image forming apparatus 30 may form an image corresponding to the retrieved print data without displaying the list of print data. In this case, the user is freed from selecting the print data.

Thirteenth Modification

In the exemplary embodiment, the spooler information indicating the storage location of the image forming apparatus 30 included in the image forming system 1 is written in the spooler list 43. The spooler information may be appropriately set. For example, only the spooler information indicating the storage location of a specific image forming apparatus 30 may be written in the spooler list 43. Alternatively, only the spooler information indicating the storage location of an image forming apparatus 30 belonging to the same sub-net may be written in the spooler list 43. For example, if the image forming apparatuses 30A, 30B, and 30C belong to the same sub-net, the spooler information indicating the storage locations of the image forming apparatuses 30A, 30B, and 30C is written in the spooler list 43. In this case, the storage locations may be shared by the image forming apparatuses 30A, 30B, and 30C.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:
a plurality of image forming apparatuses, each of the plurality of image forming apparatuses including:
an authentication unit that receives an identification information of a user;
a first storage unit that stores an image data associated with the identification information;
a second storage unit that stores an information indicating the other image forming apparatuses in the system;
a retrieval unit that accesses the other forming apparatuses in the system and retrieves image data from the other forming apparatuses; and
an image forming unit that forms an image corresponding to the image data retrieved by the retrieval unit,
wherein when the authentication unit of a first image forming apparatus which is among the plurality of image forming apparatuses in the system receives an identification information of a first user, the retrieval unit of the first image forming apparatus accesses the other image forming apparatuses in the system, searches a first image data by an identification information, the first image data being associated with the identification information of the first user, and retrieves the first image data, and the image forming unit of the first image forming apparatus forms an image corresponding to the first image data.

2. The image forming system according to claim 1, wherein each of the plurality of image forming apparatuses further comprising:
a display unit that displays a list of image data which are associated with the identification information of the user, the image data being both of the image data stored in the first storage unit and the image data which are retrieved from the other image forming apparatuses by the retrieval unit.

3. The image forming system according to claim 2, wherein each of the plurality of image forming apparatuses further comprising:
a selecting unit that receives a selection by the user selecting one of the image data from the displayed list,
wherein the retrieval unit retrieves the image data from the other image forming apparatuses according to the selection by the user from the list of the identification information of the image data.

4. An image forming apparatus that is included in an image forming system comprising a plurality of image forming apparatuses, comprising:
an authentication unit that receives an identification information of a user;
a first storage unit that stores an image data associated with the identification information;
a second storage unit that stores an information indicating the other image forming apparatuses in the system;

a retrieval unit that accesses the other image forming apparatuses in the system and retrieves an image data from the other image forming apparatuses; and an image forming unit that forms an image corresponding to the image data retrieved by the retrieval unit, wherein when the authentication unit receives an identification information of a first user, the retrieval unit accesses the other forming apparatuses in the system and retrieves a first image data which is associated with the identification information of the first user, and the image forming unit forms an image corresponding to the first image data.

5. The image forming apparatus according to claim 4, further comprising:

a display unit that displays a list of image data corresponding to the identification information of the user, the image data are both of the image data stored in the first storage unit and the image data retrieved from the other image forming apparatuses by the retrieval unit.

6. The image forming apparatus according to claim 5, further comprising:

a selecting unit that receives a selection by the user selecting one of the image data from the displayed list, wherein the retrieval unit retrieves the image data from the other image forming apparatuses according to the selection by the user from the list of the identification information of the image data.

\* \* \* \* \*